UNITED STATES PATENT OFFICE.

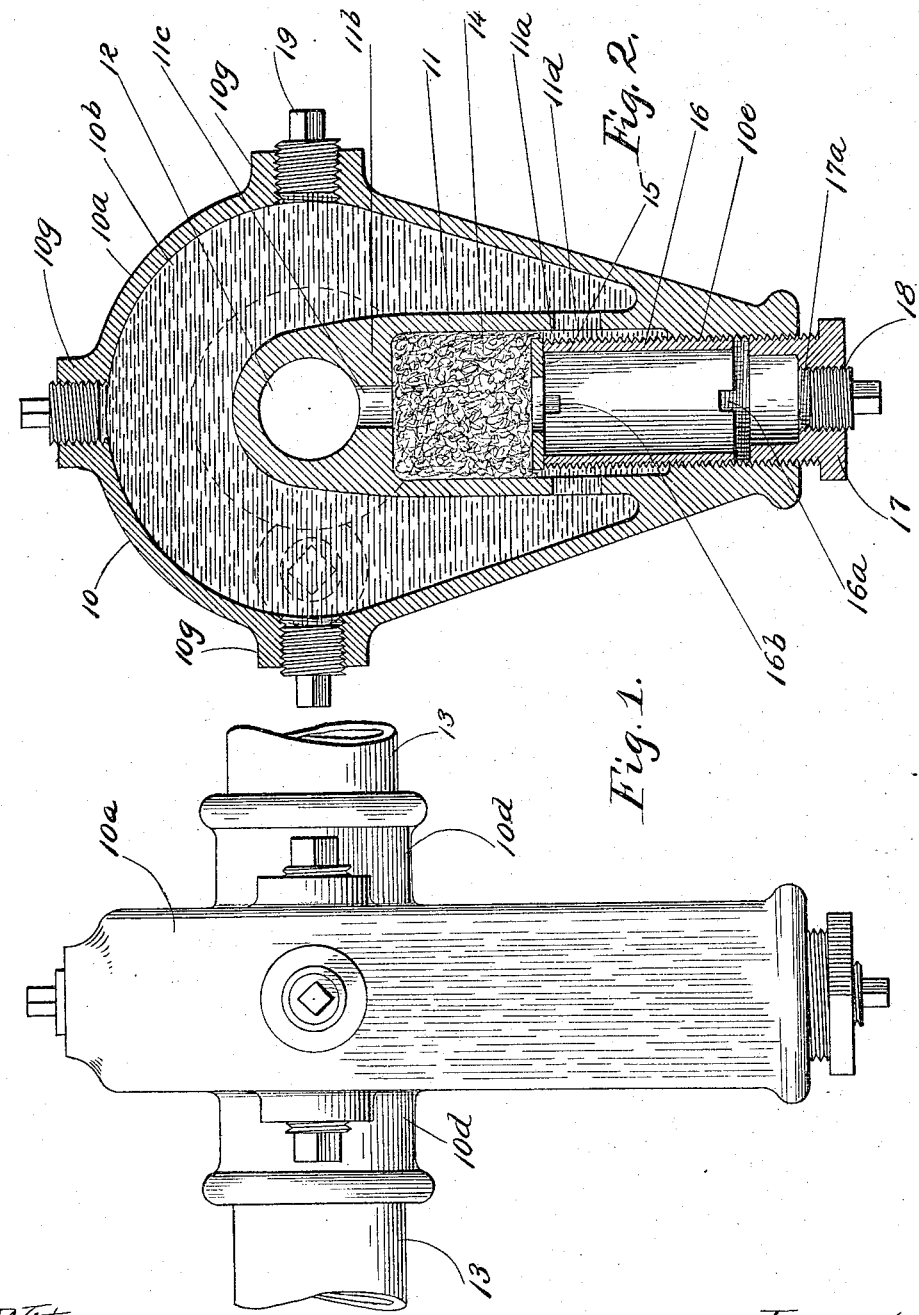

PHILETUS W. GATES, OF CHICAGO, ILLINOIS, ASSIGNOR TO HANNA ENGINEERING WORKS, OF CHICAGO, ILLINOIS, A CORPORATION OF ILLINOIS.

LUBRICATOR.

1,211,432.        Specification of Letters Patent.        Patented Jan. 9, 1917.

Application filed November 7, 1914. Serial No. 870,829.

*To all whom it may concern:*

Be it known that I, PHILETUS W. GATES, a citizen of the United States, residing at Chicago, in the county of Cook and State of Illinois, have invented certain new and useful Improvements in Lubricators, of which the following is a specification.

This invention relates to improvements in lubricators and has for its object to provide a new and improved lubricator for use in connection with an air or steam line.

The main object of my invention is to provide a lubricator which may be readily attached to an air or similar line, and is so arranged that lubrication will only take place upon and as a result of flow of fluid through the line.

Still another object is to provide a lubricator of the character described which may be located in any desired position without interfering with the lubrication.

Still another object is to provide in a lubricator of this nature a reservoir for oil or similar lubricant in connection with means which will enable the filling or replenishing of such reservoir no matter in what position the lubricator may be located.

These and other objects will be more fully set forth in the following specification as shown in the accompanying drawings, in which,—

Figure 1 is a side elevation showing my lubricator applied to an air line. Fig. 2 is a vertical section through the same.

Like numerals refer to like elements throughout the drawings.

10 designates generally my lubricator comprising a casing 10$^a$, chambered as indicated by numeral 10$^b$, to form a reservoir. Projecting into this reservoir is a cylinder member or portion 11, internally bored or chambered at 11$^a$. This chamber 11$^a$ terminates at the flange 11$^b$, as clearly shown in Fig. 2. A duct or passage 11$^c$ is provided in the flange 11$^b$ and communicates with a cross passage or duct 12 which extends therethrough. At either side of the casing 10 are provided shoulders 10$^d$, socketed or bored to form a continuation of the passage 12. These shoulders 10$^d$ may be internally threaded or otherwise suitably constructed for insertion of and engagement with pipe ends 13, or the like, the duct 12 forming therewith a continuous air or steam line, as will be apparent.

Located in the portion of the chamber 11$^a$ of the cylindrical portion 11 is a fibrous material 14, or the like, the same being highly compressed to form a compact mass. A collar or apertured plate 15 bears upon one side of this mass 14 and is retained in position thereagainst by means of an externally threaded sleeve 16. The casing 10 is internally threaded at 10$^e$, as clearly shown in Fig. 2, and the sleeve 16 when in similar relation is threaded into the cylinder chamber 11$^a$ to bear against the washer or plate 15, thereby maintaining the material 14 in compressed position.

To render the assembling of this device more easy, I slot or groove the sleeve 16, as indicated at 16$^a$, for engagement by a screw driver or the like. A plug or cap 17 is threaded into the open portion of the chamber 11$^a$ below the sleeve 16, as viewed in position shown in Fig. 2. This cap 17 is centrally apertured, as indicated at 17$^a$, being threaded to permit insertion and engagement of a plug 18. The internally bored portion of the chamber 11$^a$ is of larger diameter than the external diameter of the sleeve 16, as is shown in Fig. 2, and communicating with the space between such members and the interior of the sleeve 16 is an aperture 16$^b$. In the cylinder 11 I provide apertures 11$^d$ for a purpose to be hereinafter described. Suitably apertured bosses 10$^g$ are provided in various locations in the casing 10$^a$, and internally threaded in these bosses are the plugs 19 similar to the plug 18. It will be apparent that by means of these plugs and threaded openings the reservoir 10$^b$ may be filled with lubricant no matter in what position the lubricator may chance to be. Should the same be in a position inverted with respect to that shown in the drawings, the chambered interior of the sleeve 16 may be filled through the opening normally closed by the plug 18.

Assuming the lubricator to be in the position shown in the drawing, the oil or other lubricant to be placed in the reservoir 10$^b$, the same will flow through apertures 11$^d$ and 16$^b$, filling the space or chamber in the interior of the sleeve 16. The tightly compressed fibrous material 14 will normally prevent flow of such lubricant into the passage 12 through the duct 11$^c$, but during the flow of steam, air, or similar fluid through the pipes 13 and passage 12, oil will be drawn in a comminuted condition through the fibrous material 14 into the passage 12, from whence it will be carried by the fluid to the destination of the latter to effect lubrication of the pump or the like operated thereby.

By the construction described and shown it will be apparent that I have provided a lubricator which is an improvement on that shown and described in co-pending application of Albert J. Gates, Serial Number 759,594, in that my device is capable of containing a large amount of lubricant, and is also capable of being applied or utilized in any position.

While I have shown and described one embodiment of my invention, I do not wish to be restricted to the showing or description beyond the scope of the appended claims.

I claim:—

1. In a device of the class described, a lubricator comprising a casing, said casing being provided with a reservoir, a chamber and means to permit the flow of lubricant from said reservoir into said chamber, said lubricator being provided with a passage therethrough for communication with a fluid line and a duct therein communicating between said chamber and said passage, means to normally prevent flow of lubricant from said chamber to said passage, said means being arranged to permit such flow upon flow of fluid through said passage.

2. A lubricator comprising a casing, said casing being provided with a passage therethrough and a reservoir, the casing being further provided with a chamber in communication with said reservoir and with said passage, means to normally prevent flow of lubricant from said chamber to said passage, said means being arranged to permit such flow upon flow of fluid through said passage, said means comprising fibrous material.

3. A lubricator comprising a casing, said casing being provided with a passage therethrough and a reservoir, the casing being further provided with a chamber in communication with said reservoir and with said passage, means to normally prevent flow of lubricant from said chamber to said passage, said means being arranged to permit such flow upon flow of fluid through said passage, said means comprising fibrous material, and means to permit the filling of said chamber in any position thereof.

4. In a device of the class described, a casing chambered to form a reservoir, being provided with a chamber therein in communication with said reservoir, apertured shoulders carried by said casing and a passage extending through said shoulders and casing, the former being constructed and arranged for engagement by an air line or the like.

In testimony whereof, I have subscribed my name.

PHILETUS W. GATES.

Witnesses:
THOMAS F. SHERIDAN,
HENRY A. PARKS.

Copies of this patent may be obtained for five cents each, by addressing the "Commissioner of Patents, Washington, D. C."